June 5, 1956     H. R. RUSSELL ET AL     2,749,014
CELLULAR CONTAINERS
Filed May 7, 1952                                                   2 Sheets—Sheet 1
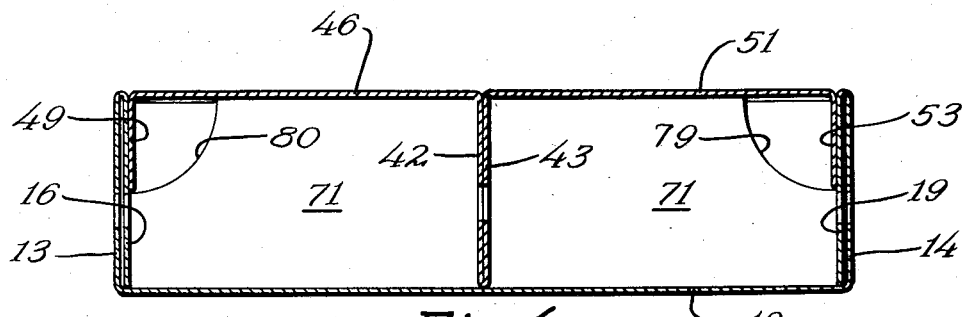
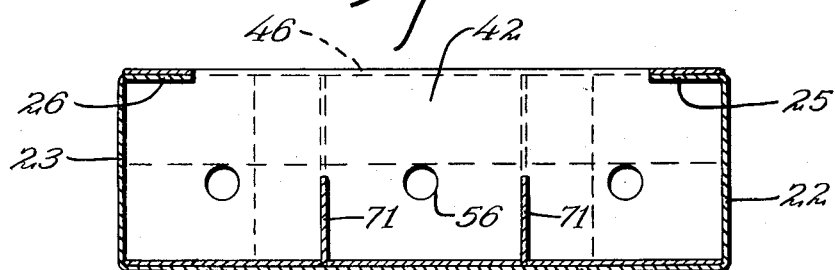
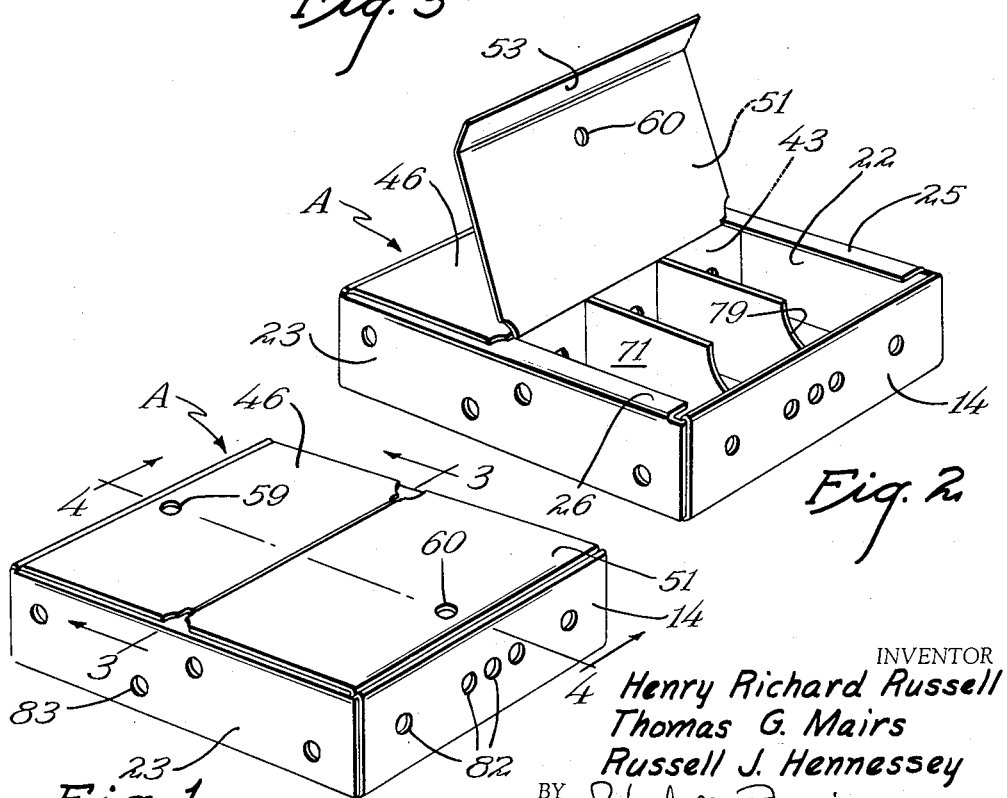
INVENTOR
Henry Richard Russell
Thomas G. Mairs
Russell J. Hennessey
BY Robert M. Dunning
ATTORNEY June 5, 1956 H. R. RUSSELL ET AL 2,749,014
CELLULAR CONTAINERS
Filed May 7, 1952 2 Sheets-Sheet 2

INVENTOR
Henry Richard Russell
Thomas G. Mairs
Russell J. Hennessey
BY Robert M. Dunning
ATTORNEY United States Patent Office 2,749,014
Patented June 5, 1956

2,749,014

CELLULAR CONTAINERS

Henry Richard Russell, Thomas G. Mairs, and Russell J. Hennessey, St. Paul, Minn., assignors to Waldorf Paper Products Company, St. Paul, Minn., a corporation of Minnesota Application May 7, 1952, Serial No. 286,486

5 Claims. (Cl. 229—27)

This invention relates to an improvement in cellular containers and deals particularly with a container useful in the storage and transportation of turkeys, chickens and the like.

In recent years it has become common practice to freeze turkeys and chickens after they have been cleaned and to maintain them in a frozen state until they are thawed for cooking. Eviscerated poultry is often placed in a plastic bag to seal the bird from air during storage. If one bird is in contact with another during the freezing operation, the birds are likely to be deformed at the point of contact. This deformation is readily apparent through the plastic transparent bag and affects the value of the frozen bird. Furthermore, if the birds are not carefully placed in individual cells during the freezing operation, the weight of the bird against a wall of the container is apt to form a flat spot on the surface of the bird when it is frozen, which again lowers the value of the bird in the mind of the customer.

An object of the present invention lies in the provision of a cellular container which includes a series of cells each capable of containing a turkey, chicken, or other such bird. If each bird is arranged in an individual cell, one bird can not contact another and therefore no deformation is caused through contact. Furthermore, the cells are so arranged that the bird is supported in a display position so that the part of the bird usually inspected at the time of sale is out of contact with the walls of the container. Accordingly no flat spots on the frozen bird will appear.

A further feature of the present invention lies in the provision of a poultry box which possesses considerable stacking strength without requiring an excessive amount of paperboard. The container is provided with end walls of double thickness and partially of triple thickness. A partition unit of double thickness extends across the center of the container to divide the same into two equal sections. This partition unit has a partition wall of double thickness, thus greatly increasing the stacking strength of the container.

A further feature of the present invention lies in the provision of a partition structure which interlocks with the lining panel of two opposed container walls and in which the partitions are notched, at a point adjacent to the lining panel so that the container may be easily assembled. This feature is of importance as boxes of this type are usually supplied in a flat condition and are set up at the time the turkeys or other poultry are packed for freezing.

These and other objects and novel features of our invention will be more clearly and fully set forth in the following specification and claims.

In the drawings forming a part of our specification:

Figure 1 is a perspective view of the container in closed condition.

Figure 2 is a perspective view of the container in partially open position.

Figure 3 is a sectional view through the center of the container, the position of the section being indicated by the line 3—3 of Figure 1.

Figure 4 is a longitudinal sectional view through the container, the position of the section being indicated by the line 4—4 of Figure 1.

Figure 5:
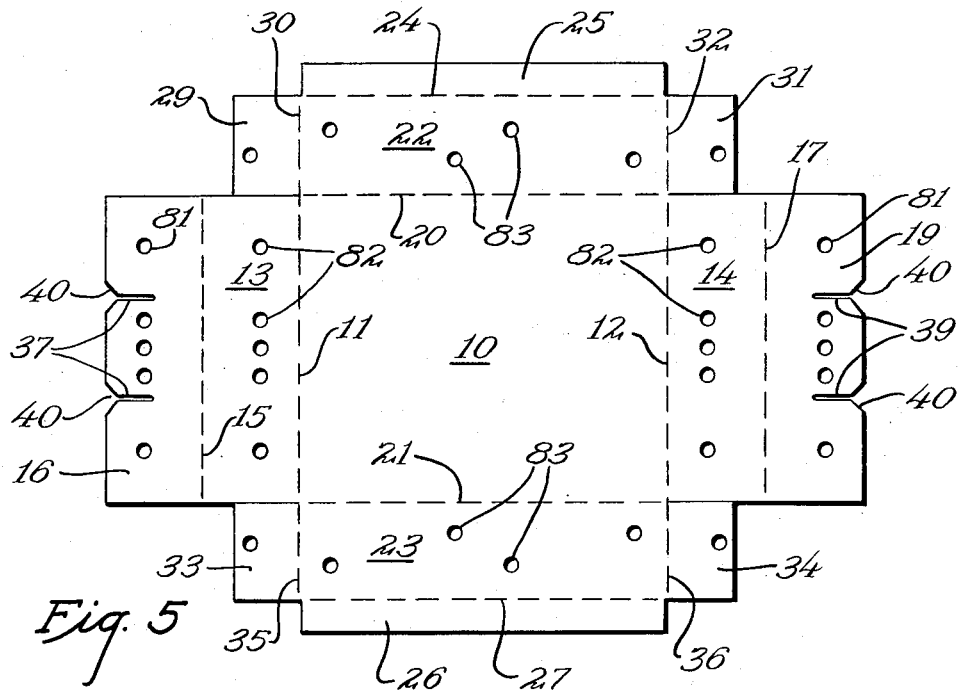
Figure 5 is a diagrammatic view of the blank from which the container body is formed.

The container is illustrated in general by the letter A and includes a bottom panel 10 which is foldably connected by parallel fold lines 11 and 12 to end wall panels 13 and 14. The end wall panel 13 is foldably connected along a fold line 15 to an end wall lining panel 16. The end wall 14 is foldably connected along a fold line 17 to an end wall lining panel 19. The lining panels 16 and 19 are identical in form.

The bottom panel 10 is foldably connected along parallel fold lines 20 and 21 to side wall panels 22 and 23 respectively. The panel 22 is foldably connected along its upper edge by a fold line 24 to a flange 25. A similar flange or flap 26 is hingedly connected to the side wall 23 along a fold line 27.

The corner flap 29 is foldably connected to one end of the side wall 22 along a fold line 30. A similar corner flap 31 is foldably connected to the opposite end of the panel 22 along a fold line 32. Corner flaps 33 and 34 are foldably connected along opposite ends of the side wall panel 23 along fold lines 35 and 36. The fold lines 30 and 35 are substantially aligned with the fold line 11 while the fold lines 32 and 36 are substantially aligned with the fold line 12.

As best indicated in Figure 5 the free edge of the end wall lining panels 16 and 19 are slotted with parallel slots arranged in spaced relation. Usually the length of the end wall panel is divided into equal units and the slots are arranged to divide the panel into such equal units. In the particular container illustrated two slots 37 are provided in the lining panel 16 while two similar slots 39 are provided in the lining panel 19. The distance between the slots 37 is substantially equal to the distance between each individual slot 37 and the closest end of the panel 16. The slots 39 similarly divided the lining panel 19 into three portions of equal length. Obviously this number of slots may be increased or decreased to divide the container into the desired number of cells in the assembled form of the container. Preferably V-shaped notches 40 communicate with each of the slots 17 and 19 so as to simplify the task of assembling partition members into the slots.

Figures 6, 7:
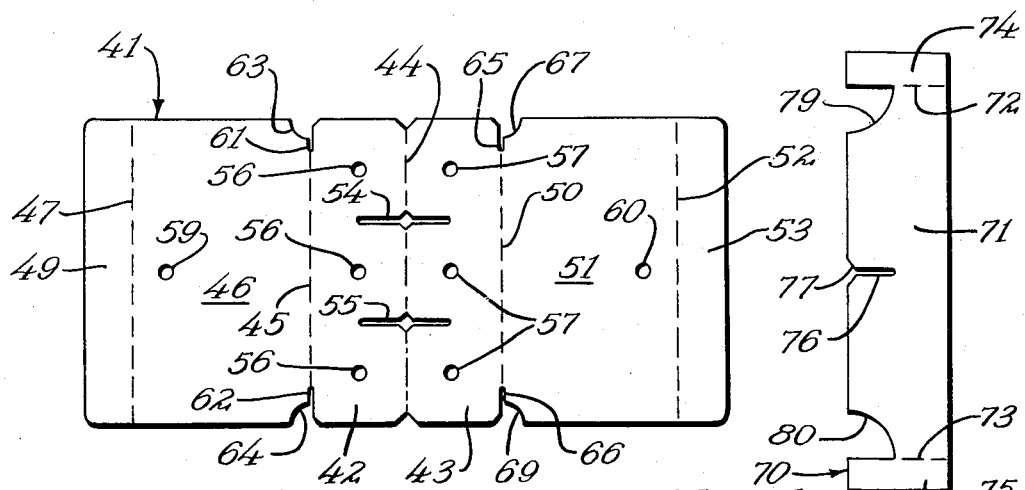
Figure 6 is a diagrammatic view of the blank of the partition unit.
Figure 7 is a diagrammatic view of the blank of the individual partition elements.

The partition unit is best illustrated in Figure 6 of the drawings. The partition unit is indicated in general by the numeral 41 and includes a pair of partition wall panels 42 and 43 which are foldably connected together along a center line of fold 44. The panel 42 is foldably connected along a fold line 45 to a cover panel 46. The cover panel 47 is connected along a line of fold 47 to a tuck flap 49. The partition wall panel 43 is connected along a fold line 50 to a cover panel 51. The panel 51 is foldably connected along the line of fold 52 to a second tuck flap 53.

The partition wall panels 42 and 43 are designed to fold into surface contact or into parallel relation in the assembled condition of the container. Elongated slots 54 and 55 intersect the center fold line 44 and extend substantially to the center of the partition panels 42 and 43. When the panels are folded into surface contact the portions of the slots 54 and 55 which lie in the panel 42 register with the remaining portions of the slots which are within the confines of the partition panel 43.

Ventilating openings 56 are provided in the partition panel 42 designed to register with corresponding apertures 57 in the panel 43. Thus air may circulate through the partition walls in the assembled form of the container. Finger apertures 59 and 60 are provided through the top panels 46 and 51 respectively, and these finger openings are designed to accommodate a finger when the cover panels are to be opened.

Slots 61 and 62 extend into the partition unit blank at opposite ends of the fold line 45 and rounded notches 63 and 64 in the cover panel 46 communicate with the slots 61 and 62 and extend to one side thereof. Similar slots 65 and 66 extend into the blank at each end of the fold line 50 and rounded notches 67 and 69 in the cover panel 51 communicate with the slots 66 and extend to one side thereof. The purpose of the notches and slots just described will be more clearly defined.

The remaining partition panels are illustrated in detail in Figure 7 of the drawings and are designated in general by the numeral 70. Each partition panel 70 includes a partition wall 71 foldably connected by parallel fold lines 72 and 73 to anchoring flaps 74 and 75 respectively. A slot 76 extends into the member 71 intermediate the ends thereof, and a V-shaped notch 77 communicates with the slot 76 and simplifies the insertion of a cooperative part in the slot 76. Rounded notches 79 and 80 are provided in the partition wall body 71, one side of each of the notches being aligned with a corresponding fold line 72 or 73.

In assembling the containers produced as described, the side walls 22 and 23 are usually folded into upright position at right angles to the bottom panel 10 and the end flaps 29, 31, 33 and 34 are folded at right angles to the wall panels to which they are hinged, these end flaps extending along the fold lines 11 and 12. The end panels 13 and 14 are then folded into right angular relationship with the bottom panel 10, these panels 13 and 14 lying outwardly of the end flaps 29, 31, 33 and 34.

When the container has been erected to this point, the partition unit 41 and the partition elements 70 which have been previously assembled together are inserted into the container. In assembling the inner portion of the container, the panels 42 and 43 are folded into side by side relation and these panels are folded in a right angular relation with the cover panels 46 and 51. The partition strips 70 are next attached by interlocking the center slots 76 with the center partition panels 42 and 43. When assembled the slots 76 embrace a portion of the panels 42 and 43 in alignment with the slots 54 and 55, while the slots 54 and 55 embrace a portion of the partition strips 71 in alignment with the central slot 76.

When the partition unit has been assembled in the manner described the anchoring flaps 74 and 75 at opposite ends of the partition panel 71 are folded at right angles to the remainder of the body. The anchoring flaps may be folded in either direction, but in the arrangement illustrated these flaps are folded outwardly away from one another so that they do not cover the ventilating openings in the end panels and the end lining panels as will be later described.

Once the partition structure has been inserted between the walls of the container body, the end lining panels 16 and 19 are folded down to overlie the anchoring flaps 74 and 75 of the partition strips 70. In folding downwardly the slots 37 embrace portions of the partition strips 71 adjoining the notches 79 and 80. As the slots 37 extend substantially half the depth of the lining panels 16 and the slots 39 extend substantially half the depth of the panel 19, the notches 79 and 80 of the partition strips 70 must also extend substantially half the depth of the partition strips. The notches permit the slotted lining panels 16 and 17 to swing down into parallel relation to the end wall panels 13 and 14, thus anchoring the anchoring flaps 74 and 75 of the partition panels between the end walls and their respective lining panels.

Ventilating openings 81 are provided in the lining panels 16 and 19 while similar ventilating openings 82 are provided in the end walls 13 and 14. The openings 81 register with the openings 82 of the adjoining end wall when the container is set up. Ventilating openings 83 are provided in the single thickness side walls 22 and 23. It will be noted that the cover panels 46 and 51 are integral with the central partition panels and thus fold down from the center of the container toward the end walls thereof. The tuck flaps 49 and 53 tuck inwardly of the end wall lining panels and are held in place by the ends of the flaps 25 and 26. These flanges 25 and 26 fold flat beneath the marginal edges of the cover panel to assist in supporting the cover and also to strengthen the side walls and to prevent them from bowing inwardly or outwardly.

As previously stated the container described is provided with six compartments, by the center partition panels and the intersecting partition strips. Obviously additional partition strips could be added to produce a greater number of cells and one of the partition strips may be eliminated and the remaining partition strip placed mid-way between the container side walls if a four compartment container is desired. The individual cells of the container are usually sufficiently large to accommodate a turkey, chicken or the like.

In accordance with the patent statutes, we have described the principles of construction and operation of our cellular containers, and while we have endeavored to set forth the best embodiment thereof, we desire to have it understood that obvious changes may be made within the scope of the following claims without departing from the spirit of our invention.

We claim:

1. A cellular container including a body portion including a bottom panel, side and end wall panels foldably connected to said bottom panel, and lining panels hingedly connected to two opposed wall panels provided with partition strip slots and foldable to lie inwardly of their respective panels, a partition unit including a container cover and a pair of foldably connected partition walls extending between the other wall panels and said container cover consisting of panels pivotally connected to said partition walls, and partition strips intersecting said partition walls and interlocked therewith, and anchoring flaps on said partition strips which are anchored in said partition strip slots with said flaps held between said lining panels and the wall panels to which they are hinged and interlocked therewith.

2. A container including a body portion having a base portion including a base panel, side and end wall panels hingedly connected to said base panel, corner flaps connected to two opposed wall panels, wall lining flaps hingedly connected to the remaining two wall panels, said lining flaps having slot means therein extending inwardly from the free edge thereof, a partition unit including a pair of partition panels foldably connected together, and located mid-way between said lining panels, partition strip means intersecting said partition panels and extending right angularly relative thereto, anchoring flaps on the ends of said partition strips and located between said lining panels and the wall panels to which they are hinged, and said partition strips being provided with arcuate notches adjacent to said anchoring flaps, the center of arcuation of said notches being substantially on the line of fold between said lining panels and the wall panels to which they are hinged, said notches interlocking with said slot means in said lining panels.

3. The structure described in claim 2 and including cover panels hingedly connected to said partition panels and tuck flaps hingedly secured to said cover panels.

4. A cellular container including a body portion including a bottom panel, side and end wall panels foldably connected to said bottom panel, and lining panels hingedly connected to two opposed wall panels and each provided with a partition strip slot therein, said lining panels being foldable to lie inwardly of their respective panels, a cover and partition unit including a pair of foldably connected partition walls in substantial surface contact extending between the other wall panels parallel to said two opposed wall panels, said unit including cover panels hingedly secured to said partition walls, a partition strip intersecting said partition walls and interlocked therewith, anchoring flaps on said partition strip which extend through said partition strip slots and are anchored between said lining panels and the side wall panels to which they are hinged.

5. The structure described in claim 4 and including inturned flanges on said other side walls, said cover panels having notches therein at the juncture between said cover panels and said partition walls to accommodate said inturned flanges therein.

References Cited in the file of this patent

UNITED STATES PATENTS

| Number | Name | Date |
|---|---|---|
| 1,137,732 | Alfred | May 4, 1915 |
| 1,740,550 | Michelin | Dec. 24, 1929 |
| 1,976,530 | Verhoven | Oct. 9, 1934 |
| 2,199,204 | Levkoff | Apr. 30, 1940 |
| 2,235,800 | Daly | Mar. 18, 1941 |
| 2,468,951 | Barter | May 3, 1949 |
| 2,475,107 | Newsom | July 5, 1949 |
| 2,597,846 | Reeser | May 27, 1952 |
| 2,665,049 | George | Jan. 5, 1954 |

FOREIGN PATENTS

| Number | Country | Date |
|---|---|---|
| 762,426 | France | Jan. 22, 1934 |